United States Patent [19]
Glebov et al.

[11] 4,392,567
[45] Jul. 12, 1983

[54] FEEDER OF BULK MATERIALS

[76] Inventors: Vladimir P. Glebov, ulitsa adm. Makarova 43, korpus 1, kv. 76; Georgy V. Krivtsov, Bakuninskaya ulitsa, 77, kv. 28; Jury V. Danchenkov, ulitsa Lesteva, 15, Kkorpus 2, kv. 57, all of Moscow; Sergei A. Khukhry, ulitsa Studencheskaya, 11, kv. 34; Sergei G. Schepotin, ulitsa Gogolya, 17, kv. 37, both of Syzran, all of U.S.S.R.

[21] Appl. No.: 206,013

[22] Filed: Nov. 12, 1980

[51] Int. Cl.³ .............................................. B65G 47/04
[52] U.S. Cl. .................................... 198/544; 198/546; 198/547; 198/565; 198/601; 222/265
[58] Field of Search ............... 198/601, 606, 561, 570, 198/566, 565, 547; 414/327; 222/265, 415

[56] References Cited

U.S. PATENT DOCUMENTS

| | | | |
|---|---|---|---|
| 1,151,956 | 8/1915 | Lea | 198/547 |
| 2,642,979 | 6/1953 | Beech | 198/547 |
| 2,748,993 | 6/1956 | Forrest | 222/415 |
| 2,975,885 | 3/1961 | Grundelman | 198/570 |
| 3,554,356 | 1/1971 | Milliken | 198/601 |

FOREIGN PATENT DOCUMENTS

| | | |
|---|---|---|
| 1220791 | 7/1966 | Fed. Rep. of Germany ...... 414/327 |
| 1556614 | 4/1970 | Fed. Rep. of Germany ...... 414/327 |

*Primary Examiner*—Jeffrey V. Nase
*Assistant Examiner*—Dennis J. Williamson
*Attorney, Agent, or Firm*—Fleit, Jacobson & Cohn

[57] ABSTRACT

A feeder of bulk materials (fuel) comprises according to the invention, a conveyor and a batcher, the case whereof is separated into at least three sections, wherein the case of the batcher incorporates drives having output shafts, each section uses a band for transferring bulk material, with bands in one section moving in opposite direction to bands in other sections, and the sections using the bands of one direction of movement are arranged alternately with the sections using the bands of opposite direction, with the drive of the sections using the bands of the same direction made common to them and furnished with output shafts coupled with shafts of the sections through clutches serving for coupling and uncoupling the drives and shafts, with the batcher case incorporating a receiver tube in the top part thereof for receiving free-flowing material, and an outlet tube in the bottom part thereof serving for delivery of bulk material from the batcher to the conveyor.

13 Claims, 4 Drawing Figures

FEEDER OF BULK MATERIALS

TECHNICAL FIELD

The present invention relates to feeders of bulk materials, and, more specifically, to feeders serving for delivering and batching high-moisture clayish ordinary fuels.

INDUSTRIAL APPLICABILITY

The invention can most advantageously be used in delivery and batching of high-moisture clayish ordinary fuels supplied from a bin to an inlet of a mill in the thermal power plant boiler installation coal pulverizer systems, and can likewise be efficiently employed for continuous batching and delivery of fuels with a lower moisture content, or for metering fuels both with and without a conveyor in metallurgy, coal-mining and chemical industries, and in agriculture.

BACKGROUND ART

The scientific and practical importance of the research work can hardly be overestimated where the studies concern the mechanism of movement under gravity of bulk materials (fuels) because the physical-and-mechanical properties and flow regularities thereof are exceedingly important for design of fuel bins and batch feeders.

The manufacturing procedure and constructional features of the bin cannot be chosen correctly unless the regularities of motion of fuel having a complicated grain-size composition and moisture content are studied in detail.

Mechanics of bulk materials are absolutely indispensable in solving many problems relating to flow of fuel from the bin.

The physical-and-mechanical properties of bulk materials and the laws of motion and flow thereof have been widely studied both at home and abroad.

All the studies carried out in the Soviet Union and elsewhere and dealing with mechanics of free-flowing bulk media define the basic parameters characterizing the physical state of bulk materials and propose various methods for determination of minimum size of the bin outlet holes depending on the incline of the outlet funnel walls, and to the normal and tangential stresses occuring in bulk materials.

They also treat the problems of bridging peculiar to bulk materials (fuels) and consider the provisions for even and continuous flow thereof.

There are also proposed preferable design options depending on the physical-and-mechanical properties of materials being handled.

Various types of unloading facilities and feeders, such as those adapted to stimulate the flow of material (fuel) through the outlet hole are considered.

The flow of bulk materials (fuels) out of the bin is commonly intermittent. This occurs due to repeated sticking of fuel in the outlet hole, adherence of large quantities of fuel to the walls, formation of stable arched cavities, etc.

In most cases the above-mentioned disadvantages are corrected manually by means of pokers. This laborous procedure is intended to preclude reduction of the number of the operating fuel mills which would otherwise disturb the fuel burning conditions and lead to high heat losses chiefly because mechanical combustion is not complete.

Hence, the efficiency of the boiler installation drops and the fuel consumption rises.

Yet, the measures against bridging and sticking do not in all cases bring about the desirable effects, and are sometimes even detrimental.

Large-scale observations at electric power plants and detailed analysis of the Soviet and foreign sources dealing with operation of the bins show that the foregoing disadvantages can be overcome by increasing the outlet hole area and bin wall incline, and by stirring fuel near the outlet hole.

The above-mentioned measures taken separately do not provide for failure-free operation of the bin, especially when the flow properties of fuel are poor.

It is therefore expedient that the measures taken to ensure continuous supply of fuel be combined.

The feeders known in the art fail to meet the requirements to efficient and continuous delivery of high-moisture ordinary fuels.

The prior-art combination feeders are essentially aggregates consisting of a drum batcher with receiver and outlet tubes, and a band conveyor, and are applicable for handling high-grade low-moisture sized fuels free from clay inclusions. If the receiver tube cross-section area is small, malfunctions occur due to bridging of fuel inside the bin, and the batcher and the conveyor are clogged even through the fuel moisture content is medium. When said feeders are used for handling dry fuel, some of it inadvertently by-passes the batcher. Besides, the feeders are quite easily clogged with foreign objects.

The above disadvantages lead to low operating dependability of the feeder as a whole.

In order to improve the operating dependability, some foreign-made scraper feeders employ gates comprising sections that open alternately in predetermined succession.

A disadvantage inherent of this type of the feeders resides in that they use divider partitions between the gates which have turned to promote the bridging effects. In addition, said feeders do not alter the tubular shape of fuel flow at the bin outlet with the result that the efficiency and continuity of fuel supply are impaired.

Also known in the art are feeders of bulk materials (fuels) adapted for delivery of high-moisture unsized clayish ordinary fuels tending to stick and bridge, wherein fuel is supplied from the bin to the mill in the fuel pulverizing systems of thermal electric power plant boiler installations operating either under vacuum or pressure, with each feeder comprising a batcher, the case whereof is separated into two sections, with bands in each individual section moving in the same direction and with the bands in different sections moving in opposite directions, wherein a top part of the batcher case incorporates a receiver tube for receiving bulk materials (fuels), and a bottom part of the batcher case incorporates an outlet tube wherethrough the bulk material (fuel) is delivered from the batcher to a feeder conveyor (cf. USSR Inventor's Certificate No. 334,902, Cl. B65G, dated Apr. 19, 1971 and USSR Inventor's Certificate No. 278,000, Cl. 23C, dated Feb. 6, 1968).

However, the foregoing feeder, just like the other analogs, does not permit, simplification of manufacture of the feeder, substantial reduction of consumed metal and even fuel supply because of sticking of lumps in fuel containing clay admixtures, and does not provide for balanced loading of the boiler installation and for appropriate maintenance and repair conditions.

In addition, when one section of the feeder fails, the load drops by half, i.e. by 50 percent, with the band speed and fuel layer thickness remaining the same.

DISCLOSURE OF THE INVENTION

It is an object of the present invention to improve the operating dependability of the feeder, to facilitate maintenance and repair, to stir fuel near the receiver tube and to eliminate areas of stagnation of bulk material inside the bin.

Another object of the invention is to simplify the construction of the feeder and to minimize the dimensions thereof and, hence, the dimensions of the building.

Still another object of the invention is to permit the use of the feeder for handling high-moisture ordinary fuels having poor flowing properties and a high content of clay inclusions.

With this and other objects in view, a feeder of bulk materials (fuels) is herein proposed, comprising a batcher, the case whereof is separated into sections, each incorporating a band for moving bulk materials, with the band in one section moving in one direction due to operation of a drive, and with the band in the other section moving in opposite direction also due to operation of a drive, wherewith a top part of the batcher case is furnished with a receiver tube for receiving bulk material, and a bottom part of the batcher case is furnished with an outlet tube wherethrough bulk material is supplied to a conveyor, and, according to the invention, the batcher case is separated into at least three sections fitted with the bands, the sections using the bands of one direction of movement being arranged alternately with the sections using the bands of opposite direction of movement, with the drive of the sections using the bands of the same direction of movement made common to them and provided with output shafts linked with shafts of the sections through clutches serving for coupling and uncoupling the drives and the shafts.

It is preferable that the bands in each section should move at different speeds.

The feeder batcher designed according to the present invention permits stirring the fuel in the area of the receiver tube with the result that the dimensions of the inlet tube can be reduced and highly reliable supply of bulk materials can be provided.

Inasmuch as the drives are independable, any required number of sections from four to one can be operated simultaneously depending on the quality of bulk material (fuel) being handled.

BRIEF DESCRIPTION OF DRAWINGS

The invention will now be described in greater detail with reference to a preferred embodiment thereof taken conjunction with the accompanying drawings, wherein.

BEST MODE FOR CARRYING OUT THE INVENTION

Figure 1:
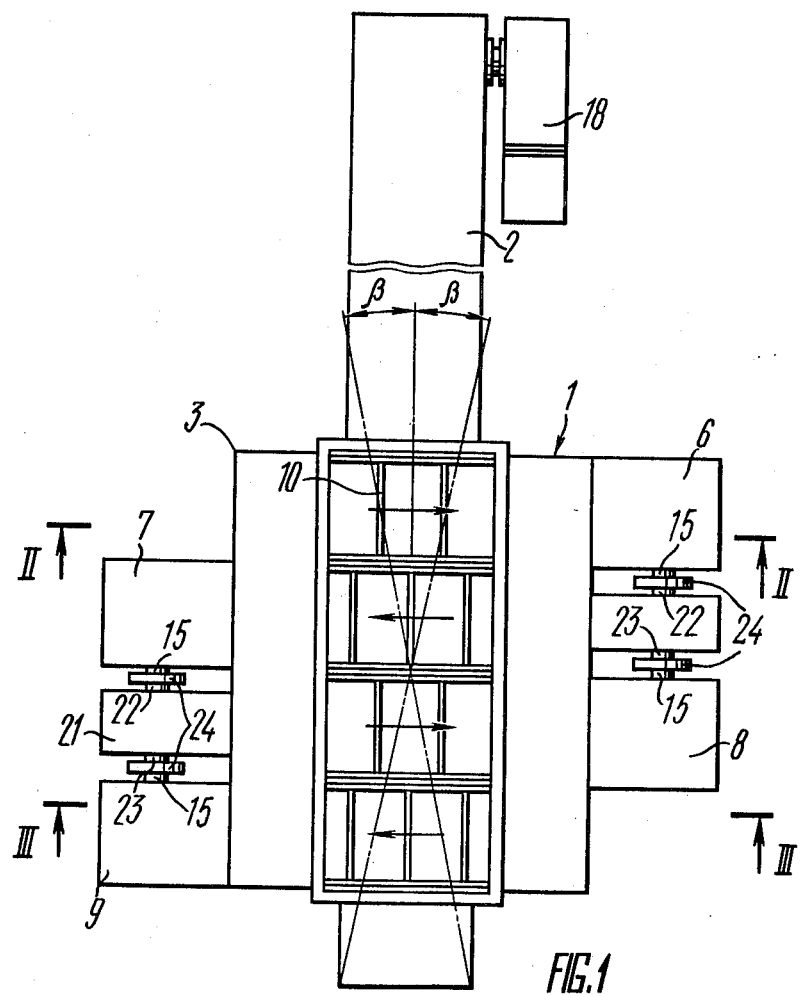
FIG. 1 is a schematic plan view of a feeder of bulk materials according to the invention.

Referring to FIG. 1, a feeder of bulk materials (fuels), according to the invention, comprises a batcher 1 and a conveyor 2 serving to supply bulk material directly to the mill (not shown in the drawings). The batcher 1 incorporates a case 3, the top part whereof mounts a receiver tube 4 (FIGS. 2 and 3) located directly under a bin of bulk material (not shown in the drawings), and the bottom part thereof mounts an outlet tube 5 serving for delivery of bulk material (fuel) from the batcher 1 to the conveyor 2.

The batcher 1 comprises four sections 6, 7, 8 and 9, each using a closed-loop band 10 adapted for moving the fuel (FIGS. 2 and 3), wherein two runs 11 and 12 are working. The bands 10 of the sections 6 and 8 (FIG. 1) move in one direction, and the bands 10 (FIGS. 2 and 3) of the sections 7 and 9 (FIG. 1) move in opposite direction.

Figure 2:
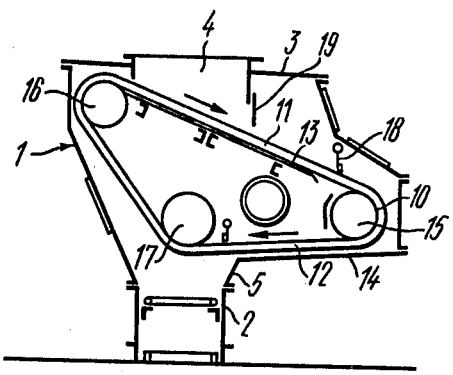
FIG. 2 is a section view taken along line II—II of FIG. 1.
Figure 3:
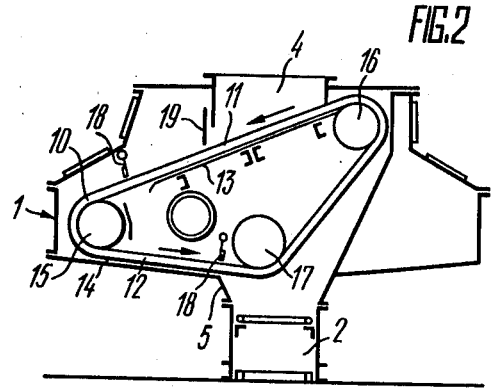
FIG. 3 is a section view taken along line III—III of FIG. 1.

The batcher 1 shown in FIG. 2 comprises the section 6, and the batcher 1 shown in FIG. 3 comprises the section 9, the section 8 being identical to the section 6, and the section 7 being identical to the section 9. In further description the whole process will be discussed with reference to the two sections 6 and 9 of the batcher 1.

Turning to FIGS. 2 and 3, the working run 11 of the band 10 in each section 6 and 9 of the batcher 1 travels over a top platform 13, and the working run 12 in each section 6 and 9 travels over a bottom platform 14. The platforms 13 and 14 are attached to the case 3 of the batcher 1, and are inclined toward the direction of movement of bulk material (fuel), with the platform 14 permitting horizontal positioning (as shown in FIGS. 2 and 3).

The bands 10 of the sections 6 and 9 are actuated by a drive shaft 15 carrying sprockets, and by top and bottom shafts 16 and 17 associated with guides, wherein the bottom shaft 17 serves as a tensioning component.

In order to preclude drawing the bulk material (fuel) toward the drive shaft 15, each section 6 and 9 uses shakers 18 located beside the sprockets of the drive shaft 15 above the working run 11 of the band 10.

The case 3 of the batcher 1 accommodates a blade-type layer thickness control 19 located near the end wall of the receiver tube 4 and serving to control the thickness of bulk material (fuel) moving out of the receiver tube 4 in the direction of movement of the band 10 in the sections 6 and 9.

Figure 4:
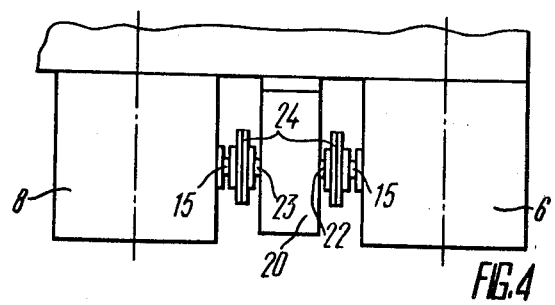
FIG. 4 shows a drive for two sections using the bands of the same direction of movement.

Each two sections 6, 8 and 7, 9 (FIG. 1) using the bands 10 of the same direction of movement employ a single drive. Thus, the sections 6 and 8 use a drive 20, and the sections 7 and 9 use a drive 21. Each drive 20 and 21 mounts two output shafts 22 and 23 (FIG. 4) linked with shafts 15 of the sections 6, 7, 8 and 9 (FIG. 1) through clutches 24 (FIGS. 1 and 4) serving to couple and uncouple the drive 20 and 21 and the drive shaft 15 (FIGS. 2 and 3) of each section 6, 7, 8 and 9.

The feeder of bulk materials operates as follows.

Moist bulk material (fuel) contained in the bin flows under gravity to the receiver tube 4 of the batcher 1 (FIG. 1). The receiver tube 4 is directly connected to the bin (not shown in the drawings). The outlet section area of the bin is to be somewhat less than the section area of the receiver tube 4 for precluding formation of zones wherein the material (fuel) supplied to the feeder batcher 1 might stick. The material delivered from the bin to the receiver tube 4 (FIGS. 2 and 3) is fed to the inclined top platform 13 of the sections 6 and 9, and is moved by the working runs 11 of the bands 10 in each section, after which the material is dropped on the section bottom platforms 14 through an opening between the top platforms 13 and the drive shafts 15 which mount the sprockets. Then the material (fuel) from the bottom platforms 14 in the sections is delivered through an outlet tube 5 (FIGS. 2 and 3) of the batcher 1 to the bottom of the conveyor 2 and further to the mill.

Since the sections 6, 7, 8 and 9 of the batcher 1 are located in alternate succession, with the sections 6 and 8 providing for one direction of movement, and with the sections 7 and 9 providing for another direction of movement of the bands 10, the bulk material (fuel) is loosened in the area of the receiver tube 4 of the batcher 1, so that formation of stagnation areas and bridging are impossible.

Besides, the bands 10 in the sections 6 and 9 can move at a speed exceeding that of the bands 10 in the section 7 and 8 (FIG. 1) to ensure even flow of bulk material (fuel) out of the bin mouth.

Each two sections 6, 8 and 7, 9 using the bands 10 (FIGS. 2 and 3) of the same direction of movement are actuated by the respective drive 20 or 21 associated with the clutches 24 (FIG. 4) fitted with a device for coupling and uncoupling of the drives 20 and 21 and the drive shaft 15 in each section (FIGS. 2 and 3).

The batcher 1 designed according to the present invention permits stirring bulk material (fuel) with the result that the feeder dimensions can be reduced, and the use of the independent drives 20 and 21 (FIG. 4) with provisions for disengaging each section 6, 7, 8 and 9 (FIG. 1) permits application of the feeder for handling fuels of different qualities by operating any desired number of sections without stopping the operating feeder.

The case 3 of the batcher 1 (FIGS. 1, 2 and 3) is a welded structure made of sheet steel. The platforms 13 and 14 of the batcher 1 are attached to the case 3. The outlets of the shafts 15, 16 and 17 of the batcher 1 and conveyor 2 are sealed with air seals serving to prevent dusting.

The feeder employs two types of protection of the mechanisms of the batcher 1 and conveyor 2 against damage: an electric protection device which de-energizes an electric motor of the drives 20 and 21 when the current rises above the specified tolerance, and a mechanical protection device in the form of a shear pin installed on the clutches 24 of the drive shafts 15 of the batcher 1 and the conveyor 2.

The feeder is reliable in handling the fuels with the working weight moisture content $W^\circ$ amounting to 60 percent and with the dry weight ash content $A^{dry}$ amounting to 45 percent.

The feeder of the present invention has been designed considering possible substantial variations of fuel physical parameters due to seasonal changes and other reasons which affect the flowing properties of materials.

The throughput of the feeder is adjustable by controlling the speed of the electromotor of the drives 20 and 21 in the range from 5 to 14 (1500 to 300 rpm) and by varying the fuel layer thickness with the thickness control 19 in proportion of 1 to 2.

As the conveyor 2 of the feeder can be inclined to the axis of the receiver tube 4 at an angle $\beta$ (FIG. 1), the feeder layout is improved considerably.

The feeder of bulk materials is a basically new metering device which gives a marked improvement in dependable supply of bulk materials (fuels) and permits cutting down the expenditure of materials.

The feeder manufacturing procedure is remarkably simple.

The feeder is substantially superior to the prior-art feeders.

What is claimed is:

1. A feeder of bulk materials comprising:
   a conveyor; a batcher having a case separated into at least three sections positioned above the conveyor; a band encompassed within each said section serving to transfer bulk material; shafts positioned in said sections for driving said bands; drive means for driving a shaft of one of said bands in one of said sections in a first direction and for driving shafts of bands in others of said sections in a direction opposite said first direction, with said section using said band moving in said first direction being arranged between said sections using said bands moving in the opposite direction of movement, said drive means including a common drive for all shafts of bands moving in the same direction of movement, said common drives having output shafts coupled with shafts of said sections through clutches serving for coupling and uncoupling of said drives and said shafts; receiver tube means adapted for receiving bulk material disposed in a top part of said case of said batcher and for supplying the received bulk material to said sections; and outlet tube means located in a bottom part of said case of said batcher above said conveyor so that bulk material is supplied from said batcher through said outlet tube means to said conveyor.

2. A feeder as claimed in claim 1, wherein said bands in each said section move at different speeds.

3. A feeder as claimed in claim 1, wherein all of said drives are coupled with all of said shafts to feed the maximum amount of bulk materials to said conveyor.

4. A feeder as claimed in claim 1, wherein adjacent bands are simultaneously operable so as to simultaneously deliver material from two adjacent sections to said conveyor.

5. A feeder as claimed in claim 1, wherein said bands have runs that are parallel and horizontally spaced from each other.

6. A feeder as claimed in claim 1, wherein one of said bands has a run with a first working run inclined downwardly in the direction of movement of bulk material and having an upper portion receiving materials from said receiver tube, and a second working run extending downwardly from a lower end of said first working run to an outlet of the section containing said one of said bands.

7. A feeder as claimed in claim 6, wherein the direction of movement of said first working run is opposite the direction of movement of said second working run.

8. A feeder as claimed in claim 6, wherein one of said sections has a layer thickness control blade disposed therein, the blade having a lower surface positionable in spaced relationship to said first working run of said band of said one of said sections to thereby control the thickness of a layer of bulk material moved along said first working run.

9. A feeder as claimed in claim 1, wherein said drives of said bands include shafts extending parallel to the direction of movement of bulk materials on said conveyor, the shaft of the drive for said band moving in said first direction of movement being disposed on one side of said conveyor and the shaft of the drive for said bands moving in the opposite direction of movement being disposed on a side of said conveyor opposite said one side.

10. A feeder as claimed in claim 1, wherein the bulk materials are high-moisture clayish materials used as fuel.

11. A feeder of bulk materials comprising:
   a batcher for receiving bulk material and having a case separated into at least four sections;
   a band in each section for conveying material from an upper inlet of the section to a lower outlet of the section;
   independent shaft means for driving the band in each section;
   first common drive means for driving selected ones of said shaft means in a first direction;
   first clutch means disposed between said first drive means and each of said selected ones of said shaft means for selectively coupling and uncoupling said first drive means with each of said selected ones of said shaft means;
   second common drive means for driving remaining ones of said shaft means in a direction opposite said first direction, said remaining ones alternating with said selected ones of said shaft means;
   second clutch means disposed between said second drive means and each of said remaining ones of said shaft means for selectively coupling and uncoupling said second drive means with each of said remaining ones of said shaft means; and
   common conveyor means disposed below the outlet of each section for conveying material away from said sections.

12. A feeder as claimed in claim 11, wherein said inlets of said sections are disposed to receive material from a common hopper outlet.

13. A feeder as claimed in claim 11, wherein each of said first and said second clutch means allows simultaneous coupling of one of the associated shafts and uncoupling of another of the associated shafts.

* * * * *